United States Patent [19]

Mulch

[11] 3,910,696
[45] Oct. 7, 1975

[54] SLIDE CHANGING EQUIPMENT FOR MAGAZINE SLIDE PROJECTORS

[75] Inventor: Hans Mulch, Wetzlar, Germany

[73] Assignee: Ernst Leitz G.m.b.H., Wetzlar, Germany

[22] Filed: Jan. 24, 1975

[21] Appl. No.: 543,807

[30] Foreign Application Priority Data
Jan. 29, 1974 Germany............................ 2404028

[52] U.S. Cl. ............................................... 353/116
[51] Int. Cl.² ........................................... G03B 23/04
[58] Field of Search ............ 353/21, 116, 104, 105, 353/106, 107, 114, 115, 117, 118

[56] References Cited
UNITED STATES PATENTS

| | | | |
|---|---|---|---|
| 2,260,660 | 10/1941 | Darwin | 353/104 |
| 3,053,146 | 9/1962 | King | 353/104 |
| 3,143,036 | 8/1964 | Rohmann | 353/116 |

*Primary Examiner*—William D. Martin, Jr.
*Assistant Examiner*—Steven L. Stephan
*Attorney, Agent, or Firm*—Gilbert L. Wells

[57] ABSTRACT

Slide equipment for magazine slide projectors having slide pushrods driven by control means, one of these pushrods serving to insert the slides into the image aperture and the other to move back those that were projected into the magazine.

The transport path associated with the insertion pushrod 12 and the image stage (groove 46a) are located in a common plane 41. A further slide path (72, 73) for moving back the slides is provided on either side of this plane and the particular slide 4 located in the image stage is displaced by a transporter (45,74) actuated by driving means 51–71 along one of the lateral slide return paths depending on the particular selected transport direction of the magazine 3 which may be switched for advance or reverse into the removal path of the back moving pushrod 13 engaging both lateral slide paths. The control means 30–44 for the back moving pushrod and for the insertion pushrod and the driving means for the transporter are operative for different lengths of time during a slide changing.

16 Claims, 9 Drawing Figures

1

SLIDE CHANGING EQUIPMENT FOR MAGAZINE SLIDE PROJECTORS

CROSS REFERENCE TO A RELATED APPLICATION

Applicant claims priority under 35 U.S.C. 119 for Application Ser. No. 24 04 028, filed Jan. 29, 1974 in the Patent Office of the Federal Republic of Germany.

BACKGROUND OF THE INVENTION

The present invention relates to slide changing equipment for magazine slide projectors, wherein two pushrods for slides driven by control means are provided, one of them serving to introduce the slides into the image stage and the other serving to bring back the previously projected slides over a special path into the magazine.

Equipment of this kind is already known. For instance, a slide projector is known, comprising two adjoining image stages and two transport pushrods which are simultaneously effective so that when a new slide is introduced from the magazine, the previously projected one at the same time is removed from the image aperture. This measure supposedly ensures that the projection interval ordinarily bridged by inserting a stop is kept as short as possible. The "dark periods" of most projectors are fairly long because the insertion and extrication processes are shifted in time with respect to each other. Because the position of the return pushrod to the insertion pushrod is fixed in the above-mentioned equipment, the latter may be used only for a single direction of magazine motion.

The same applies to those changing arrangements, which are also known, wherein both insertion and expulsion of the slides is carried out by means of a common slide pushrod, which essentially moves along a single path. In this case the following slide is pushed behind that located in the image stage and which is to be replaced. The previously projected slide is carried along on the return path of the changer, so that the next one may assume its place in the image stage now released. This arrangement is applied only to changing equipment wherein the slides do not closely adjoin one another, and wherein the supply stack and the outgoing stack are separated by a partition. The above arrangement is not applied to compartment magazines because removal and return of the slides cannot take place in the same plane (the same magazine compartment).

SUMMARY OF THE INVENTION

The present invention addresses the task of providing changing equipment for compartment magazine slide projectors so that slides may be changed for both advance or reverse motion of the magazine, the projection dark time being further shortened thereby with respect to prior art equipment. This is achieved by the present invention in that the transport path associated with the insertion pushrod and the image stage are located in the same plane, in that furthermore a return slide path is provided on either side of this plane for the purpose of slide return, in that the particular slide located in the image stage is displaced by a transporter actuated by driving means to one of the side return paths of the slides depending on the particular forward or reverse switched transport and further actuated by a back moving pushrod acting on the two slide side return paths, and in that the control means of the return

2 pushrod and insertion pushrod and the driving means for the transporter are designed to be effective for different lengths of time during a slide changing.

The two slide pushrods and the transporter preferably are driven by the same motor. However, they are associated with different power take-offs that are actuated at different times. In this manner one provides for instance that the transport and the return pushrod are actuated only a certain time after the start of insertion of a new slide. Therefore, the change of slide proper during which motion takes place in the image aperture need not extend over the entire time of inserting or returning the slides, but rather is shortened on account of the "pre-pulled" slide insertion. This pre-pulling brings about an essential improvement in transition if the magazine compartment and the image aperture are not directly adjoining but rather are some space apart, which generally is the case. The projection dark time is so reduced to a minimum as to correspond to the time during which the motion of the projected slide is visible in the image aperture.

The slide pushrods may be detachably connected to their drive means, preferably by means of couplings or clutches. One may in this way interrupt the action of the slide pushrods into the magazine in order to bring the latter into arbitrary positions manually or by selective automation.

Pursuant to a further concept of the present invention, the control means for both slide pushrods are so designed that the latter are operated at differing speeds of displacement. This measure allows further improvement regarding the picture sequence intervals. Appropriately the drives for the slide pushrods and for the carriage are cams.

In order to reliably move the slides inside the image aperture and to true them, the transport appropriately functions jointly with a holding device. The carriage itself consists of a lever rod system, though it may also advantageously consist of a toothed roller which may be advanced stepwise and of which the tooth gaps serve as slide guidance paths.

Pliers or forceps for instance may be used as the fastening or holding device. The latter are actuated in synchronism with the roller advance system (stepping system) by means of positioning means. The holding device however may also be opened and closed directly by the slide as the latter is inserted or removed into or from the image aperture. The forceps keep the slide in the center and force-locked.

In a further embodiment of the concept of the present invention, and with particular regard to slide projectors having image stages covered by a pivoting stop or the like during slide changes, the stop is closed immediately prior to the start of carriage actuation, to be opened again after the new slide has been moved in. Special switching means are provided to that end, however this task may be assumed by the slide itself, at least in part.

BRIEF DESCRIPTION OF THE DRAWINGS

The invention is best described by reference to the appended drawings which show an embodiment of the invention, wherein.

DESCRIPTION OF THE PREFERRED EMBODIMENTS

Figure 1:
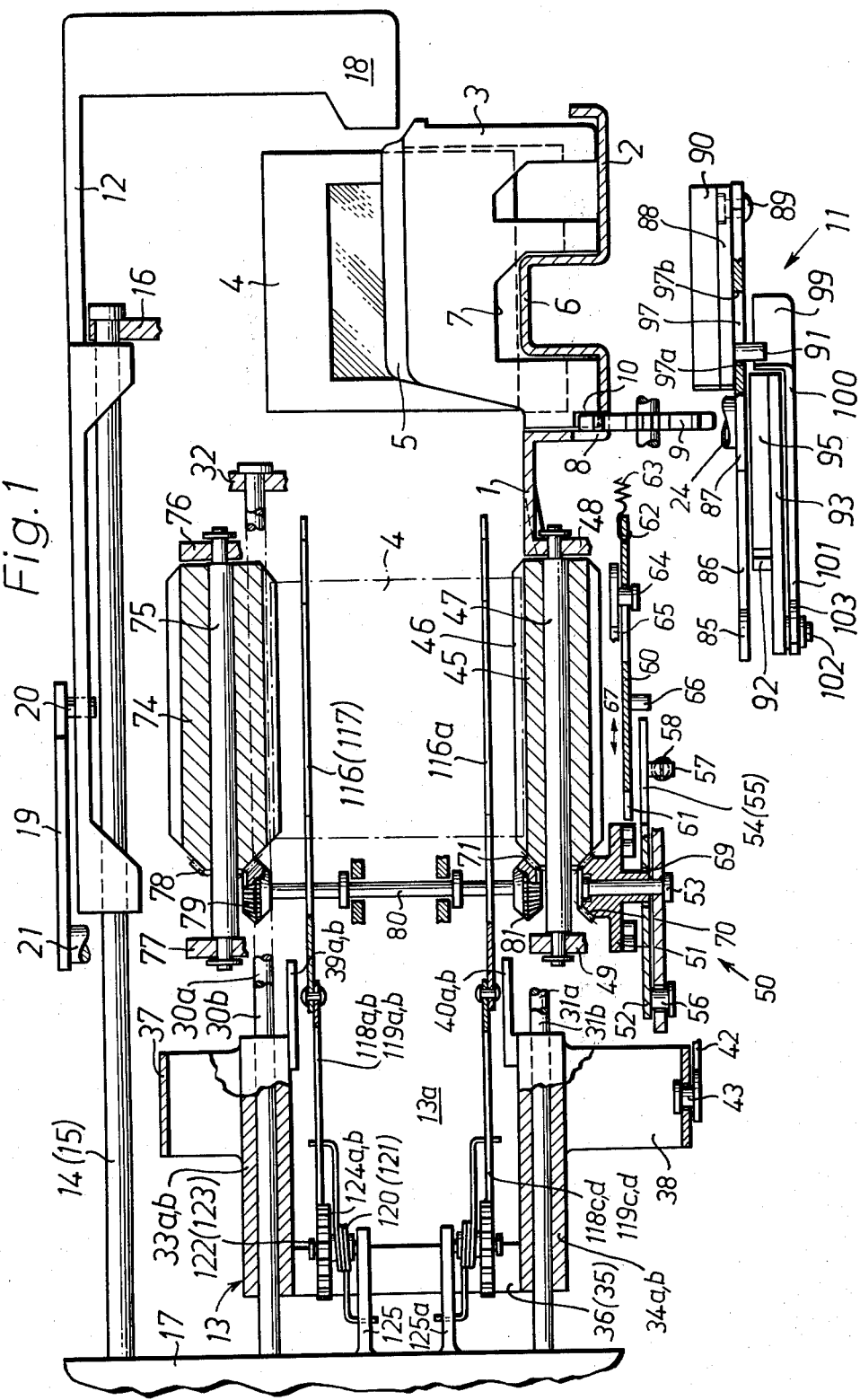
FIG. 1 is a lengthwise section through the image stage plane of the slide projector.

As particularly shown in FIG. 1, base plate 1 of the projector extends into the magazine guide shaft 2. The latter seats magazine 3 holding slides 4 which are separated by compartment partitions 5. A lifting ramp 6 penetrates the magazine through a lengthwise break 7 and lifts the slides to the elevation of base plate 1 forming here simultaneously the slide guide path or part of the image aperture. A break 8 is located in base plate 1, this break being penetrated by transport wheel 9 meshing with the teeth 10 of the magazine. Forward switching of transport wheel 9 is caused by control equipment 11, which is described further below.

Two gripper arms are provided to move the slides, one of these being denoted as pushrod 12 and the other as back mover 13. Both gripper arms are guided independently from one another and are also driven independently from each other.

Pushrod 12 slides on two rods 14 and 15 which at one end are fastened to plate 16 and at the other to housing wall 17. That part of the pushrod 12 which acts with the slide is of such design that it will grasp only one slide each time.

Figure 2:
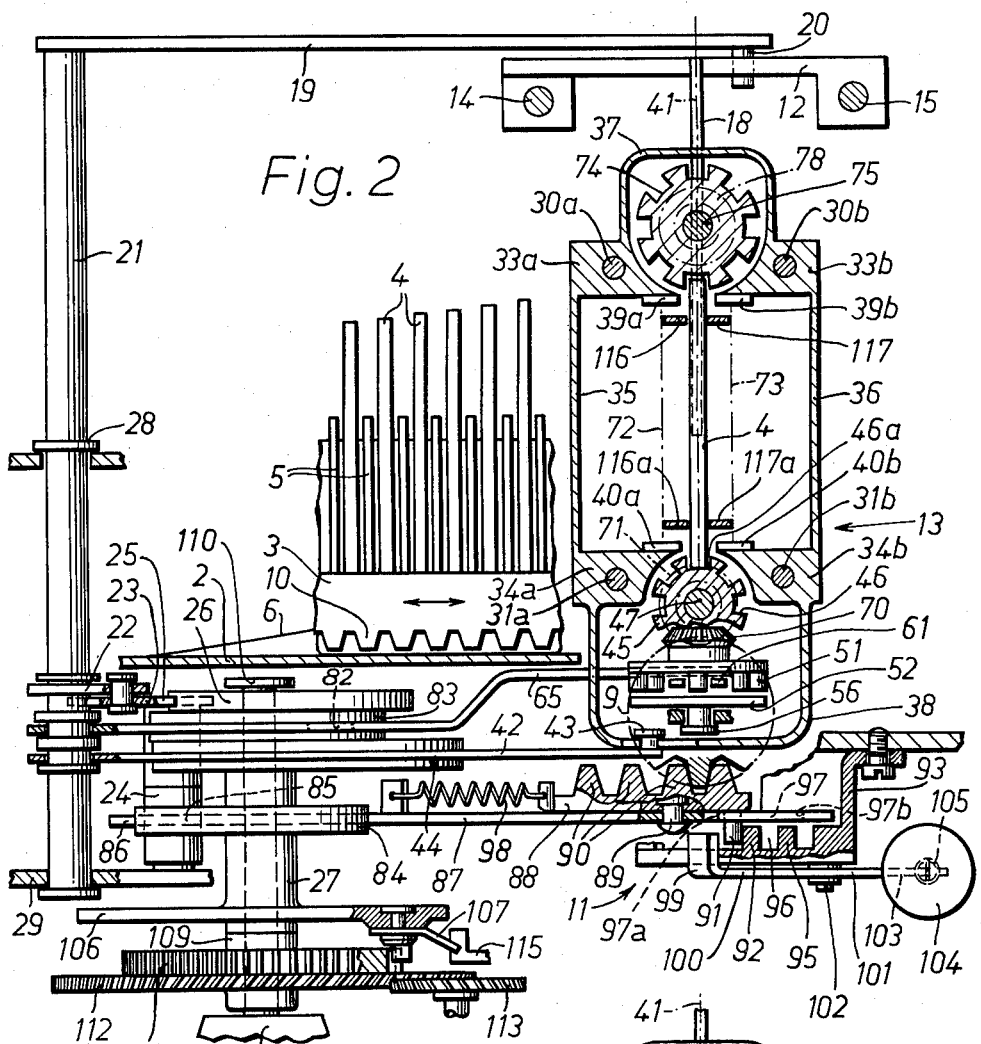
FIG. 2 is a side view with part of the image change equipment shown in cross section.
Figure 9:
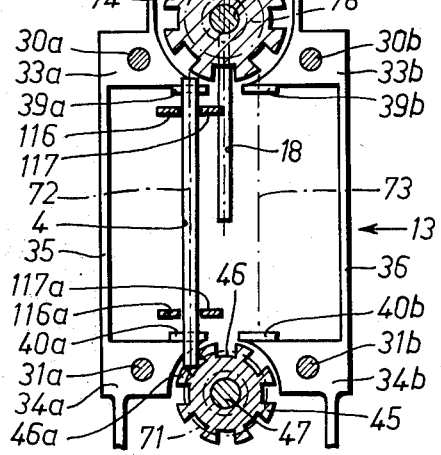
FIG. 9 shows in cross section the transporter for the image change equipment in another operational position.
Figure 3:
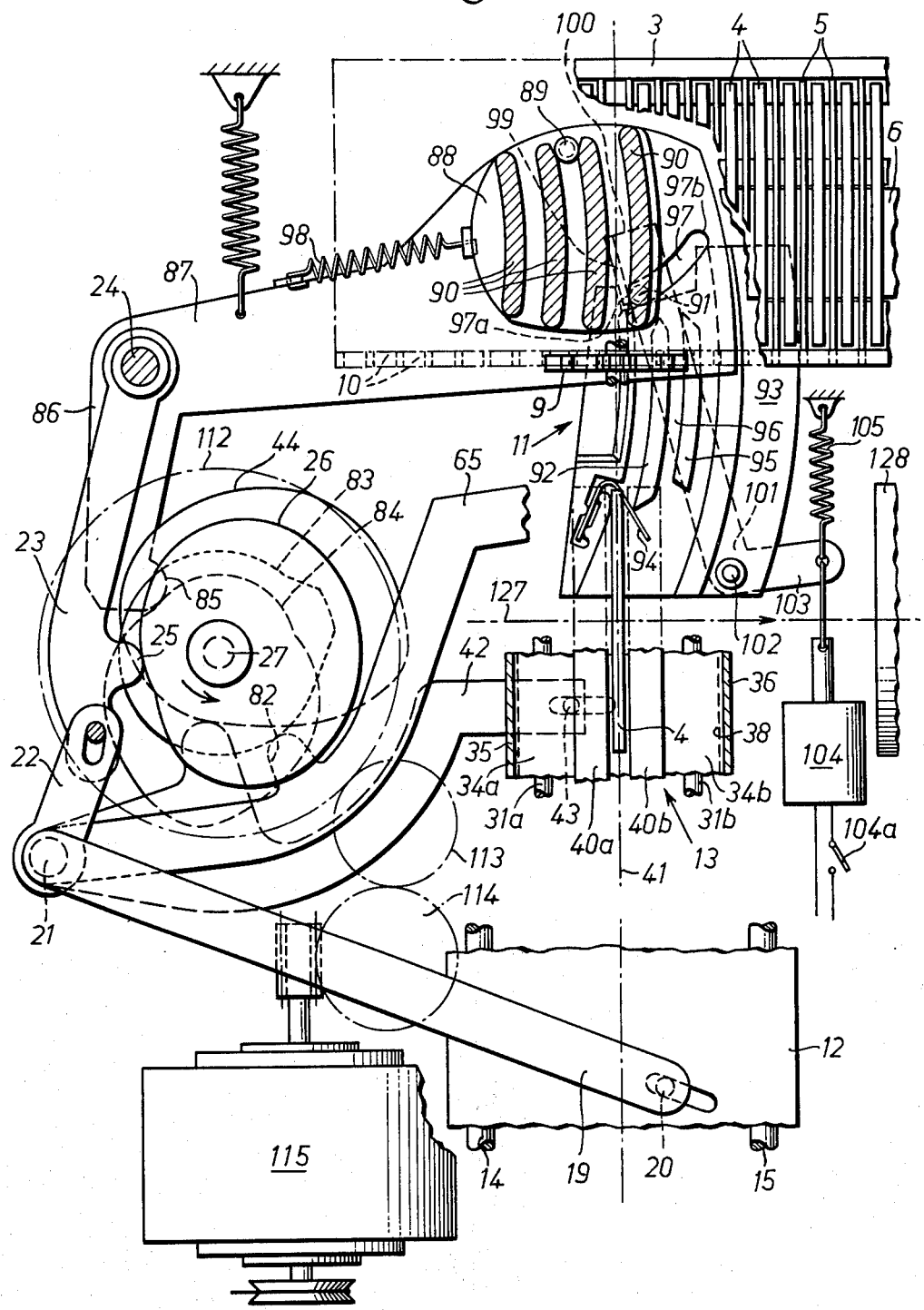
FIG. 3 is the drive mechanism of the slide projector, shown in top view.

Pushrod 12 is actuated by a lever 19 and is connected to the latter by a pin slot connection 20. Lever 19 itself is fastened to an axle 21 which, as shown by FIG. 2 and FIG. 3, also supports another arm 22 which is also rigidly connected to it. Arm 22 is connected in articulating manner with a lever 23 pivoting about axle 24 and controlled from a cam 26 by means of its scanning pin 25. Cam 26 is rigidly seated on a hub 27 carrying further cams and the drive of this hub is further described below in connection with other operational modes. Axle 21 is supported by the bearings 28 and 29 and serves as the fulcrum for further pivoting levers.

Back mover 13 is guided in the same manner as the pushrod. Pairs of rods 30a, 39b and 31a, 31b are used to that purpose. They are fastened at one end in plate 32 and at the other in housing wall 17. The shape of back mover 13 is best seen in FIG. 2. It consists of a cage-like body with upper and lower pairs of rails 33a, 33b, and 34a, 34b, with lateral straps 35, 36 and upper and lower connecting crosspieces 37, 38. The rails are provided with extensions 39a, 39b, and 40a, 40b acting as the actual back pushing element. Their centers are always offset by one width of slide compartment, on both sides of the slide guide plane 41. In side view, the back mover 13 is U-shaped and provided with a break 13a freeing the range of the image aperture.

Pivoting lever 42 pivoting about axle 21 drives back mover 13. This lever 42 is coupled to crosspiece 38 by means of the pin/slot connection 43. Pivoting lever 42 is controlled by cam 44 which, as cam 26, is mounted on hub 27.

The slide motion path associated with pushrod 12 and largely formed from base plate 1 is in the same plane as the image stage. A roller 45 is used as support path for the image stage and as the transport system for the required slide transverse motion. This roller is provided with lengthwise slots or grooves 46. The groove bottoms support the slides. Roller 45 may be moved back or forth by one groove spacing by means of step switching system 50 and the core of this roller 45 is a shaft 47 supported by bearings 48 and 49.

Figure 5:
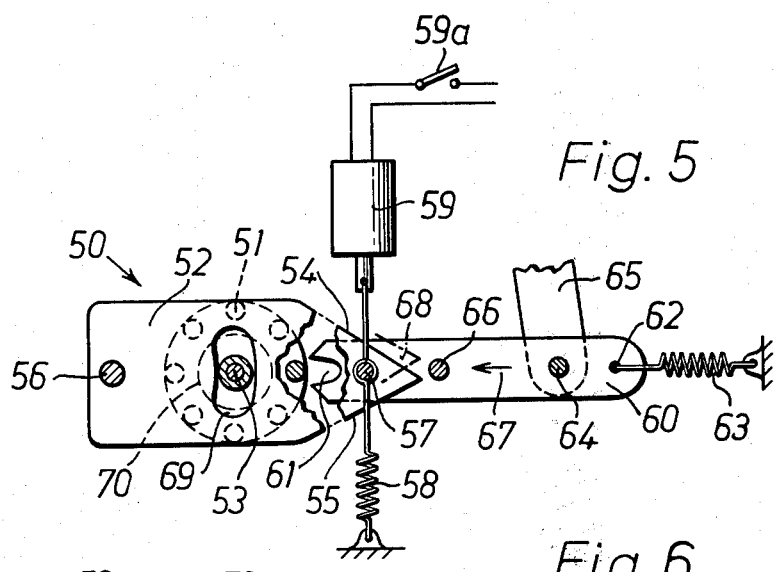
FIGS. 5 and 6 are a step switching circuit for the roller motion in top view and lengthwise section.
Figure 6:
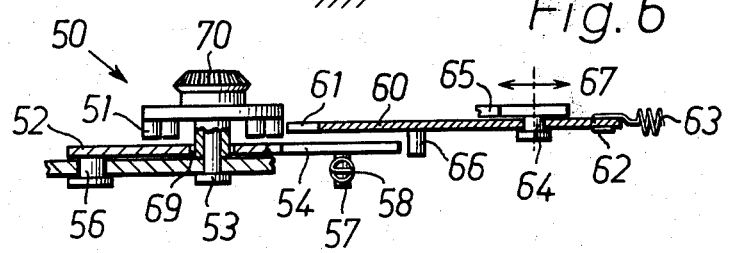

The step switching system consists essentially of pin wheel 51 pivoting on axle 53 mounted to plate 52. Axle 53 may pivot about axle 56 and is provided with two oppositely oriented bevels 54, 55 FIG. 5, at the free end and with a bolt 57. The latter is acted on by an oppositely located spring 58 and an electromagnet 59 energized by a switch 59a. A slider 60 also is part of the step switching system, this slider being provided with a claw on the side of the pin wheel and being kept under spring tension on the opposite side at 62 by spring 63. An axle 64 simultaneously providing the connection to the setting lever 65 acts as bearing.

A bolt 66 operates in conjunction with bevels 54, 55. For the position shown in FIG. 5, bolt 66 upon actuation of setting lever 65 in the direction of arrow 67 makes contact with bevel 54. When magnet 59 is energized, plate 52 assumes dotted position 68. Then bolt 66 slides along bevel 55 to the extent the setting lever is moved.

Claw 61 meshes with pin wheel 51 during the sliding process and switches this wheel forward or backward by one step depending on the position of plate 52 or depending on any energization of magnet 59. The motion of the plate is limited by slot 69.

Pin wheel 51 supports a bevel gear 70 meshing with a bevel gear 71 mounted on roller 45. The step switching motion of pin wheel 51 is transmitted in this manner to roller 45, which thusly is moved forth or back so that slide 4 inserted into the upper groove 46a is moved in plane 72 or 73. The slide is then located in the removal path of pushrod elements 39a, 40a, or 39b, 40b.

In order to ensure reliable guidance of the slides, a further roller 74 is provided besides the one serving as support, roller 74 laterally orienting the slides at their upper edges. This roller 74 therefore is also designed with grooves and supported similarly. Hub 75 and supports 76, 77 fulfill that purpose. Bevel gears 78, 79, shaft 80 and bevel gear 81 are provided as carrying means; and bevel gear 81 meshes with bevel gear 71 which is driven by the step switching system.

The setting lever 65 actuating the step switching system 50 is pivotable about axle 21 as may be seen in FIG. 3, and is provided with a sensing beak 82 lying against cam 83. The latter and cam 26 associated with the pushrod and cam 44 associated with the back mover are mounted on hub 27.

Hub 27 further comprises a cam 84 to control the magazine advance. The associated setting member with sensing beak 85 is denoted by 86. The latter is pivotable about axle 24. A sector 88 is pivotably supported at fulcrum 89 at lever arm 87 of setting member 86. This sector is provided with four fins 90 which may be made to mesh with the teeth of magazine moving gear 9. Because of the slanted position of the fins, pivoting the setting member causes the transport wheel to advance by one tooth. In order to maintain the position of sector 88 during meshing, a pin 91 is provided at its lower side, which slides along ledge 92 of a limit stop 93 and prevents deviation towards the opposite side. When in swung out position upon termination of magazine motion, pin 91 is forced by spring 94 into a path 96 formed by ledges 92 and 95, so that there is no feasibility of rotating back transport wheel 9 by one step when setting member 86 or sector 88 is being swung back.

Pin 91 dips into a milled-out recess 97 with stops 97a, 97b in setting member 86, bounding thereby the two end positions of sector 88. For the initial position shown in FIG. 3, which corresponds to forward motion of the magazine, spring 98 pushes pin 91 against the front stop 97a of milling 97. By means of lug 99 at arm 100 of angular lever 101, pin 91 is moved into the other end position. An angular lever pivotable about axle 102 is provided with an electromagnet 104 actuated by switch 104a and serving as a setting member acting on arm 103 and with a spring 105 acting as back mover. Because of such a position, sector 88 is made to move back by one step transport wheel 9 when fins 90 of this sector pass through the teeth of this wheel. In the process, pin 91 slides along the outside of ledge 95, but at the termination of this motion (the magnet again being without power), may reach path 96 because of the action of spring 98, and return by this path 96. This ensures that motion wheel 9 keeps its position when setting member 87 is swung back.

A further disk 106 is mounted on hub 27 besides cams 26, 44, 83 and 84, this disk being part of a coupling. Disk 106 comprises a ratchet 107 which engages a ratchet wheel 108. The latter is seated on shaft 109 which is supported coaxially with hub 27 in bearings 110 and 111.

Shaft 109 is drive connected with the drive motor 115 by means of its gear 112 and intermediate gears 113 and 114, and rotates constantly in one direction. The ratchet is released by a switch element 115. Upon a complete revolution, the ratchet is disengaged by means not shown and thereby the switching process for a slide change is terminated.

Slide support in the image stage, as already described above, consists in one of the groove bottoms of roller 45. The slides are further held in place by forward stepping roller 74 which is in synchronism with roller 45. However, even when the step switching system is so set that there is each time precise truing with respect to image stage plane 41, the lengthwise grooves do not ensure sufficient guarantee the slides will be in a defined position in the image aperture. A further device is provided to that end and this holding mechanism consists of two equal clamping devices acting on the lower and upper edges of the slide in the image aperture.

Figure 4:
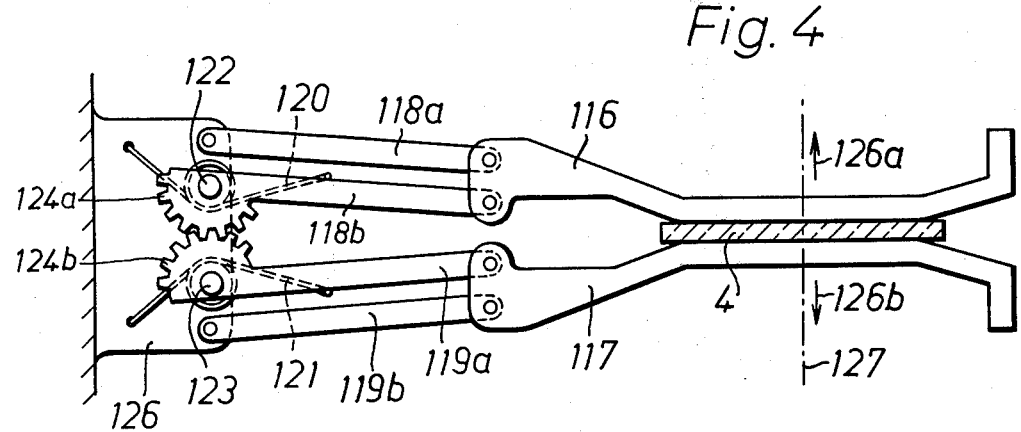
FIG. 4 is a holding device for the slides, shown in top view.

As shown by FIG. 4, two pressure guides 116, 117 supported on parallelogram arms 118a, 118b and 119a, 119b respectively form the clamping elements. These arms are loaded by springs 120, 121. The inside parallelogram arms 118b, 119a are of sector design in the area of their supports 122, 123 in a base 125. These sectors 124a, 124b are toothed and mesh together. One provides in this manner that the pressure guides always move outwardly in even manner when the slide is moving in the direction of arrows 126a, 126b. Arms 118a, 118b and 119a, 119b maintain the pressure guides parallel, whereby the slide is always kept plane-parallel, even in those positions in which the transport (roller 45 with synchronous roller 74) brings it into one of the side paths in planes 72 and 73. FIG. 2 merely shows pressure guides 116, 117 of the upper clamping mechanism and pressure guides 116a, 117a of the lower one. Only pressure guide 116a and base 125 a of the lower clamping mechanism are shown in FIG. 1 for the sake of simplicity, because as already mentioned, both mechanisms are wholly identical and work together.

The optic axis of the projector is denoted by 127. Only objective 128 among the optical components is shown.

Figure 7:
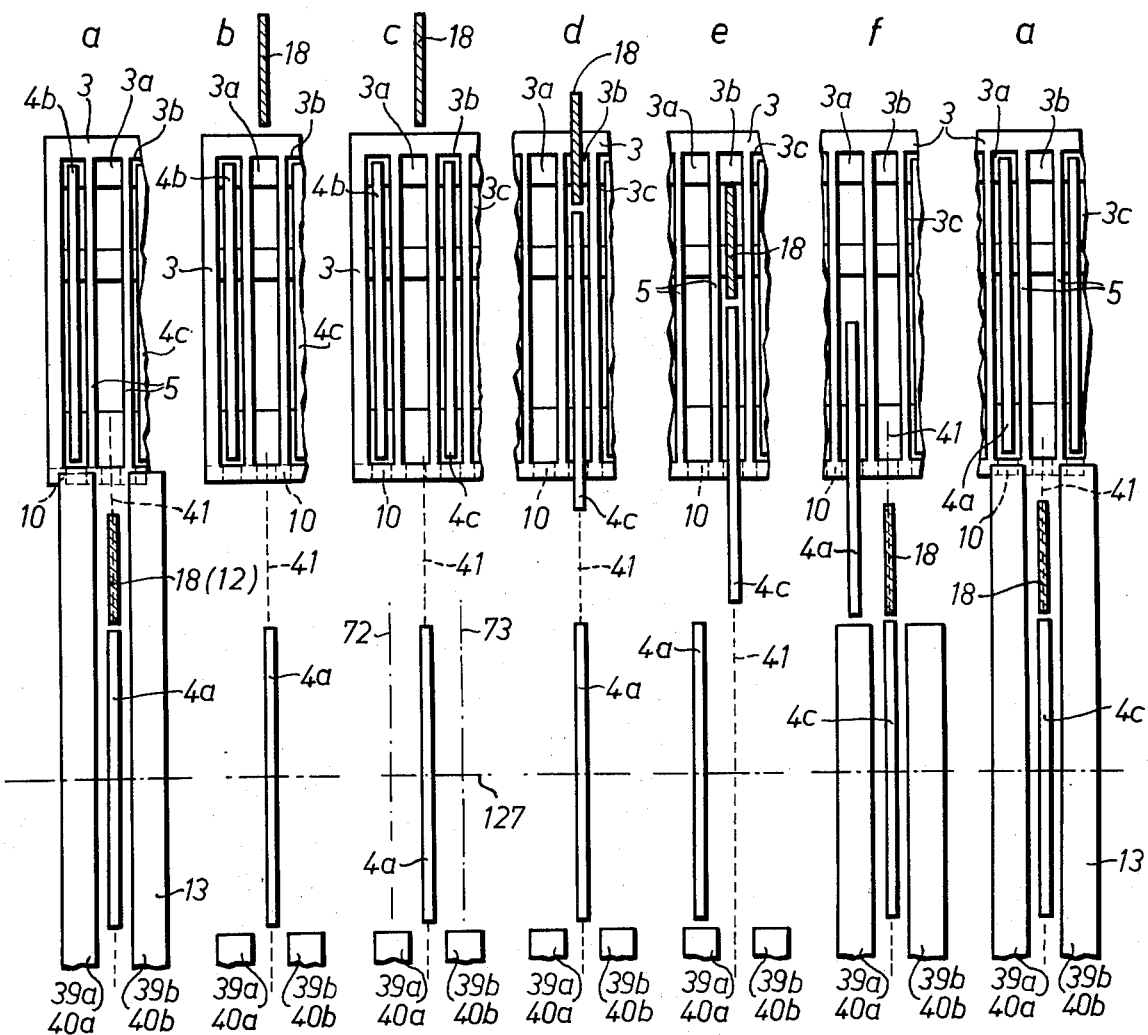
FIGS. 7 and 8 represent the operational sequences.
Figure 8:
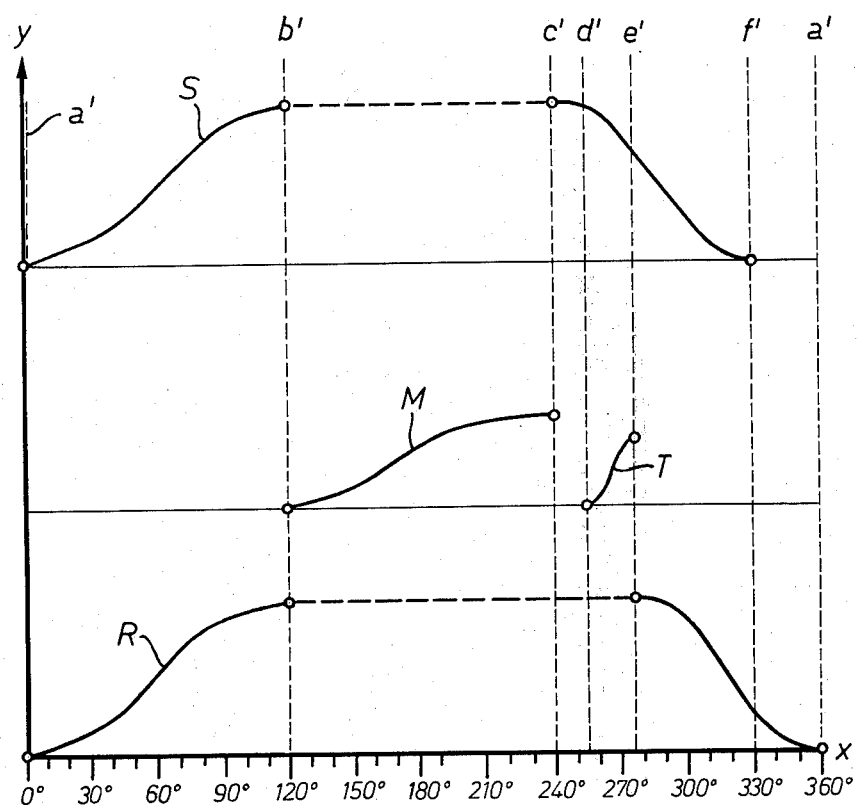

FIGS. 7 and 8 show the individual stages in slide changes and operational sequences. The same reference numerals for the pushrod, the back mover, the magazine, the image aperture and the optical axis are used in FIG. 7 as in the corresponding parts in FIGS. 1–6. The slide in the optic axis, i.e., the one in the projection position, is denoted by 4a, the corresponding empty compartment of the magazine by 3a, the two neighboring compartments by 3b and 3c, and the slides in the latter by 4b and 4c. The individual stages, which are further described below, are denoted by a–f.

The effects of the individual cams are observed from FIG. 8. Cam elevation is shown on the y-axis and rotation on the x-axis. Cam S moves pushrod 12; can R actuates back mover 13; M and T denote the cams acting on transport wheel and the transport of the magazine. The dashed lines represent the no-action stages. Angular positions a', b', c' etc. correspond to positions a, b, c, of FIG. 7.

The equipment operates as follows: assume a slide 4 is located in the projection position. Pushrod 12, back mover 13 and their drive and transmission components are in the position shown in FIGS. 3 and 7a. The same applies to the transport system (roller step switching system) and to the magazine switching means. If now image change with advance for magazine 3 is initiated by actuating the switch component 115, FIG. 2, ratchet 107 engages ratchet wheel 108 so that hub 27 with cams 26, 83, 44 and 84 are carried along. The first stage of rotation amounts to approximately 120°. During same, back mover 13 is brought back from the IN position and is then located together with its extensions 39a, 39b, and 40a, 40b immediately behind the image stage. Also, during this phase, pushrod 12 moves back from the slide 4a in the projection position through the magazine into the READY position (FIGS. 1, 7b and 8b').

Slide 4a in the image stage presently still is in a plane 41 as is also its empty compartment 3a in magazine 3. In the next stage, the magazine is advanced by one step. This takes place by means of cam 84 swinging out setting member 86 and thereby causing fins 90 to mesh with transport wheel 9.

This process terminates for a total rotation of 240° (position c'). The setting member and its sector 88 during continuation of the process moves back into the initial position, pin 91 sliding in path 96 and preventing reverse rotation of transport wheel 9, as already described above.

The operational stage following position c or c' initiates insertion of adjoining slide 4c FIG. 7d. Slide 4a first remains in the projection position, but is shifted sideways the moment the following slide reaches the image stage. This section corresponds to the course between positions d and e and d' and e' respectively. Setting lever 61 grips one of the pins of pin wheel 51. Simultaneously bolt 66 slides along bevel 54, so that the slider is pivoted, the pin wheel being carried along. Spur gear 70 seated on this pin wheel transmits this switching step to rollers 45 and 74, which thereby revolve in opposite directions. The slide held in their grooves thereby is brought into the return guidance plane 72 (FIGS. 1, 2, 7e, 8e' and 9). The slide therefore arrives below the support plane of base plate 1, however bevels are provided at the latter's insertion side to ensure that the returned slide will slide into the magazine without encountering obstacles. Pressure guides 116, 117 move out sideways while the slide is being moved out in the direction of the optic axis.

Meantime, slide 4c being advanced by pushrod 12 has reached a position immediately before the entry to the image stage (FIG. 7e). This slide is moving in plane 41 and presently moves into the rollers.

Simultaneously, the back mover, and especially its two extensions 39a, 40a, move slide 4a, which was carried already to its lateral return path 72, back into its empty compartment 3a in the magazine, the latter having been shifted during stage b, c, or b', c' in the same direction as the slide in the optic axis which had been moved by the transport means. FIG. 8 shows that the effective periods of back mover and pushrod are not the same. This difference holds not only with respect to the time intervals, but also with respect to the slide insertion stage for commencement and termination of the setting process.

The insertion process for the new slide 4c ends when the position f or f' has been reached. The back mover does travel further, terminating its motion shortly thereafter. The initial position, for the projection of a following slide, is reached again in this stage.

If now a slide change involving back motion of the magazine is involved, i.e., another projection of the previously shown slide, switches 59a and 104a are actuated together with the required triggering process. The operational stages take place similarly to those of the advance control. However, angular lever 101 presently is actuated to make pin 91 abut stop 97b. Sector 88 is carried along and, together with fins 90, is then at such an obliquie position that the transport wheel moves back by one step when lever arm 87 is reset.

Plate 52 is displaced into the position shown in dashed lines upon actuation of electromagnet 59. Thereby bolt 66 slides along bevel 55 when slider 60 is advanced so that claw 61 also is constrained to move in the same direction.

In lieu of the two magnets 59 and 104 with associated switches 59a and 104a, a single reversing system may be used, consisting of one electromagnet and one switch preferably mounted in the remote control of the projector.

The above described example contains no stop. This means that a sharp image appears on the projection wall only to time c or to position 240° in FIG. 8. The projection surface remains bright during further sequence, until position 275° is reached, though at lesser image sharpness. A blurred effect takes place until f' = 330°.

If it is desired to prevent any kind of defocusing, a stop is inserted, which is effective between positions c', f'. Stop control is obtained as for the other operational modes by means of a cam mounted on hub 27.

I claim:

1. In a slide changing apparatus for magazine slide projector having slide pushrods driven by control means, one of said pushrods service to insert the slides into an image aperture and the other to move back those slides that have been projected into the magazine, the improvement comprising:
a transport path and a projecting stage located in a common plane and the insertion pushrod serving to insert slides along said path, a slide return path located alternatively on either side of said common plane, transporter means actuated by driving means to transport a slide that has been projected from said projecting stage to said return path, and also to transport said magazine in the same direction, said other pushrod acting to move a slide that has been transported to said return path along said return path back to said magazine, said transporter means being operable alternatively to move a slide to either side of said common plane to give either a forward or reverse operation, and control means being operative so that the pushrods and the driving means operate to move a slide from the magazine to the projection stage, then to the return path, and then back to the magazine.

2. The apparatus of claim 1, wherein the two slide pushrods and transporter are driven by a single motor, and are associated with control and driving cams which are separate and operative over different time intervals.

3. The apparatus of claim 1, wherein said slide pushrods are detachably connected by means of clutches, with their control and driving means.

4. The apparatus of claim 1, wherein said control means for both slide pushrods have means for being driven at different transport speeds.

5. The apparatus of claim 1, wherein power takeoff means are provided for the insertion pushrod, the other pushrod and the transporter having means for relatively shifting in time the start of a new slide insertion and the triggering of the changing equipment, further the removal of the previously projected slide from the image stage with respect to each other.

6. The apparatus of claim 1, wherein cam gears serve as power takeoff means for the two slide pushrods and the transporter.

7. The apparatus of claim 1, wherein means are provided for time triggering the control means for the transporter and the start of the removal of the previously projected slides after the beginning of a new slide insertion.

8. The apparatus of claim 7, wherein the transporter includes a clamping system for the slides.

9. The apparatus of claim 1, wherein a lever rod system is used as the transporter.

10. The apparatus of claim 1, wherein a step switching system is used as transporter and driving means (51–71), comprising at least one toothed roller (45), the gaps (46) between the teeth serving as slide guide paths.

11. The apparatus of claim 8, wherein said clamping system consists of two clamping devices.

12. The apparatus of claim 11, wherein said clamping devices are spring biased towards each other and moved apart by insertion of a slide between them.

13. The apparatus of claim 1, wherein the transporter means comprises two synchronous tooth rollers, one of these providing the lower support for the slides and the other forming an upper orientation and safety ledge.

14. The apparatus of claim 13, wherein said image stage is covered by a pivoting diaphragm during slide change, whereby during a slide change process the diaphragm is closed by means of setting members prior to actuation of the transporter and that upon insertion of the slide into the image aperture said diaphragm is opened also by these setting members.

15. The apparatus of claim 13, wherein said image stage is covered by a pivoting diaphragm during slide change, wherein said diaphragm penetrates the image aperture so as to be opened by the slide being inserted.

16. The apparatus of claim 13, wherein said other pushrod is U-shaped in cross section and provided with a break in the region of the projection stage.

* * * * *